Oct. 22, 1968  C. J. HILL  3,406,425
POULTRY GIZZARD PROCESSING MACHINE
Filed Oct. 20, 1966  2 Sheets-Sheet 1

Inventor:
Carl J. Hill
By:
Darbo, Robertson &
Vandenburgh  Attys

United States Patent Office 3,406,425
Patented Oct. 22, 1968

3,406,425
POULTRY GIZZARD PROCESSING MACHINE
Carl J. Hill, Box 409, Canton, Ga. 30114
Filed Oct. 20, 1966, Ser. No. 588,177
11 Claims. (Cl. 17—11)

The present invention relates to improvements in poultry gizzard processing machines, particularly with respect to that portion of the machine involving the detaching of the stomach and the removal of the lining from the poultry gizzard, and the following disclosure is offered for public dissemination upon the grant of a patent therefor.

The general type of machine to which the present improvements relate is illustrated in Figures 11–15 of my prior Patents 3,159,872 and 3,172,148. Poultry gizzards come in an infinite variety of shapes and sizes. This greatly complicates the problem of mechanically processing the gizzards so as to produce the product sold to the consumer, namely a gizzard which has been split open, cleaned and washed and with the lining thereof removed. Machines of the type identified in the foregoing patents have proven to be a substantial advance in the art, yet the improvements disclosed and claimed herein are of great assistance in producing a satisfactory product with a minimum amount of attention by employees.

Further objects and advantages will become apparent from the following description taken in conjunction with the drawings in which.

Figure 1:
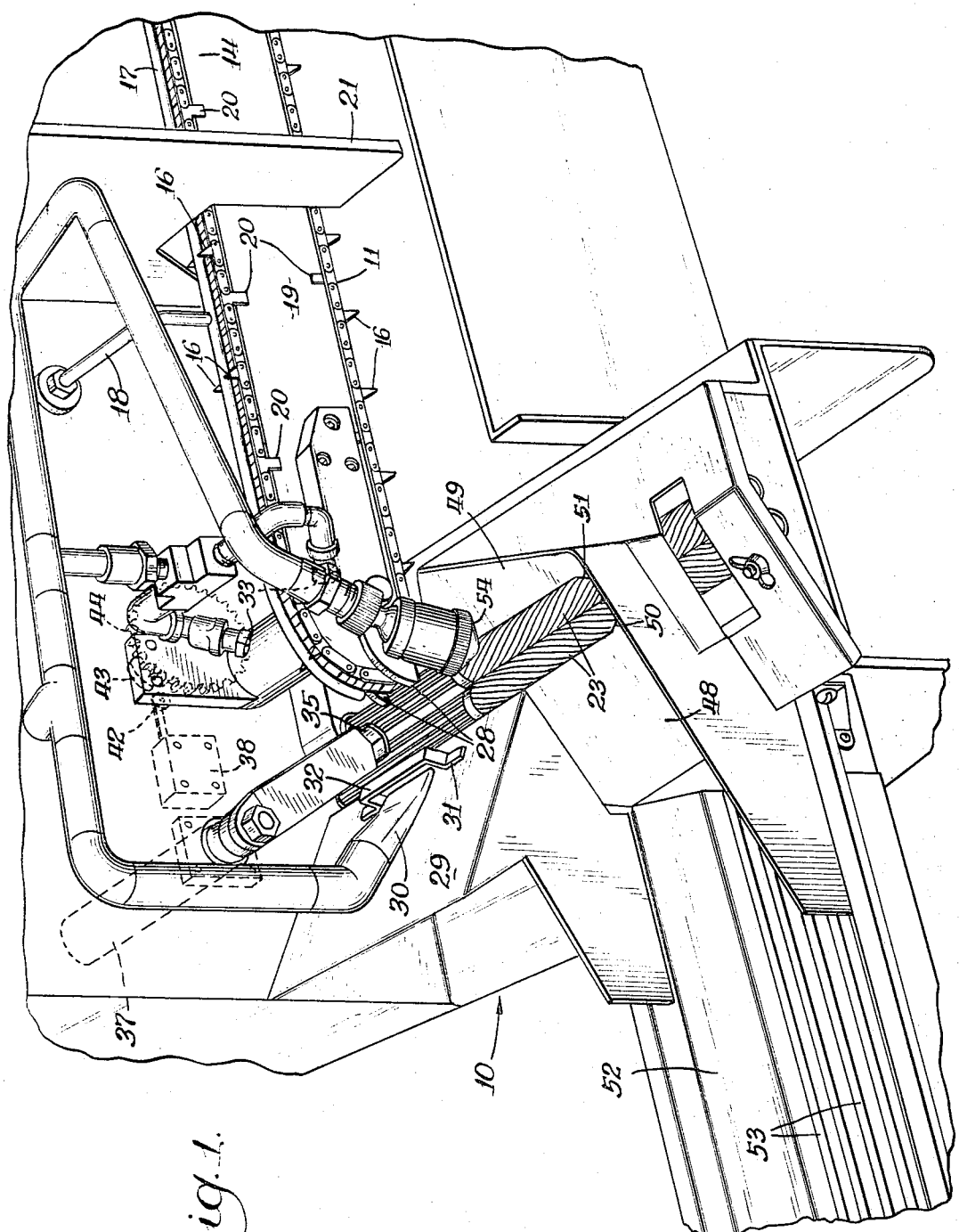
FIGURE 1 is a perspective view of a portion of a gizzard processing machine embodying the improvements of the present invention.
Figure 2:
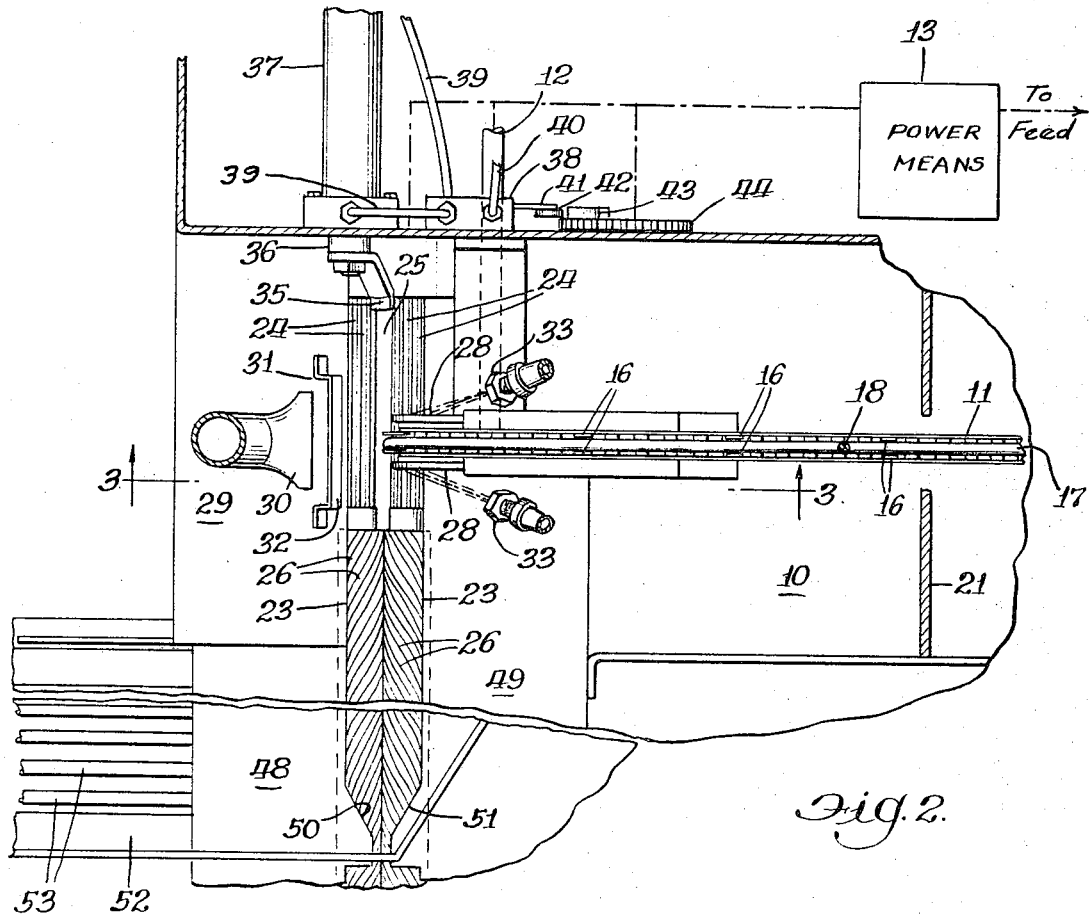
FIGURE 2 is a plan view, with portions broken away, of the embodiment illustrated in FIGURE 1.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

The general overall concept of machines of the type to which the present improvements pertain may be seen by reference to Figures 11–15 of the previously identified patents. The machine includes a frame generally 10 on which is mounted an endless chain conveyor 11. The conveyor includes at least one sprocket (not shown) upon which chain 11 is mounted. One sprocket is secured to shaft 12, driven by power means 13 in a direction such that the upper run of the chain moves in the direction indicated by arrow 14 toward a discharge point which is defined by the end of the chain as it moves about the sprocket secured to shaft 12.

Chain 11 has a plurality of spaced points or projections 16. On the upper run of the chain the points 16, which are in side-by-side pairs, are received on opposite sides of a guide 17. Guide 17 is mounted from frame 10, as by means of supports 18. A central guide plate 19 is employed for chain 11. The chain has fingers 20 on opposite sides of guide plate 19 to center the chain along the plate.

By reference to the foregoing patents, it will be seen that the gizzards to be processed are loaded on chain 11 and engaged by points 16. It is highly desirable that the gizzards have the stomachs attached thereto. The stomachs are then used to orient the gizzards, both for cutting and for lining removal. To this end the gizzards with stomachs attached are loaded on chain 11 so that the stomach moves along the upper run of the chain ahead of the gizzards. After being loaded on the chain, a knife positioned above the upper run of the chain cuts the upper portion of the gizzards (and stomachs). In cutting, the two halves of the gizzard are not completely separated. The sides of the gizzards hang down at opposite sides of the chain but remain supported thereon. Thereafter the cut gizzards pass through a washing section which removes the contents from the split gizzards (and stomachs). In the illustrated embodiment the end of the washing section is defined by wall 21.

Figure 3:
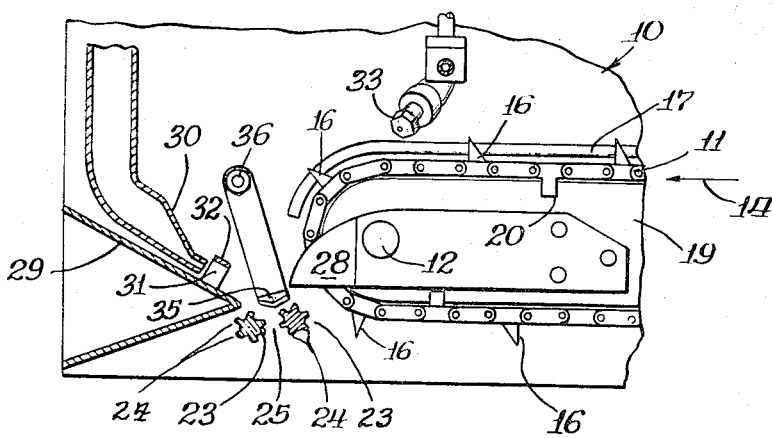
FIGURE 3 is a partial sectional view as seen at line 3—3 of FIGURE 2.

Extending transverse to the conveyor 11, at the discharge station, are a pair of rolls 23. These rolls have two distinct portions. The first portion of the rolls comprises a plurality of longitudinal ribs 24 extending parallel to the axis of the rolls and defining valleys therebetween. At this portion the ribs on the adjacent rolls are spaced from each other to define a space 25 therebetween. The second portion of the rolls 23 has a plurality of interengaging spiral teeth 26, in the form of helical gears. As best seen in FIGURE 3, the roll 23 under the end of the conveyor chain 11 (the right hand roll in that view) has its axis of rotation somewhat above the axis of rotation of the other roll. The two rolls are suitably journaled on frame 10 and one of them is connected to power means 13 for rotation in a direction such that the tops of the two rolls rotate toward each other and then down underneath through the center line.

It is intended that the stomachs, preceding the gizzards along the top run of the chain, descend through opening 25 between the rolls. To ensure this the end of guide 17 curves about the curved end of chain 11 at the discharge point. Also, there are guides or cams 28 spaced at opposite sides of the chain to position the stomach and gizzard and ensure detachment from points 16 on chain 11. Opposite the end of chain 11, on the other side of rolls 23, is a shelf 29 which slopes downwardly and toward the rolls. A water nozzle 30 directs a blanket of water over the lower portion of shelf 29 and onto that portion of roll 23 at the discharge station. Straddling this flow of water is a raised support 31 which has a downwardly slanting upper surface 32.

At opposite sides of the conveyor 11 are water jet nozzles 33. The jet from nozzles 33 is directed at the area that will be occupied by a gizzard at about the time that the gizzard is released from chain 11. The force of the jet is such as to drive the gizzard away from the conveyor (to the left in the drawings) so that the opened interior of the gizzard (which had been upwardly as the gizzard moved along the chain) is forced over against the upper surface 32 of support 31. Previous to this the stomach attached to the gizzard will have entered space 25, it being sufficiently small to have been bypassed and not moved by the jets from nozzles 33. From its position on surface 32 the gizzard moves downwardly onto rolls 23 with the opened interior of the gizzard resting on the rolls. The ribs 24 exert a downwardly pull on the stomach and aid in aligning the gizzard on the rolls. The gizzard normally is disposed flat on the two rolls and is spread out with the opened interior on the rolls.

At this point a pusher 35 moves the gizzard from the ribbed 24 portion of the rolls onto the toothed 26 portion of the rolls. Pusher 35 is secured to the piston rod 36 of an air cylinder 37. Air cylinder 37 is controlled by a four-way air valve 38 with pipes 39 connecting the valve and the cylinder. A pipe 40 connects valve 38 to a suitable source of air under pressure. Valve 38 has an actuator 41 with a cam follower 42 attached thereto. Cam follower 42 and the actuator 41 are moved by a cam 43 on a gear 44. The arrangement is such that with actuator 41 in the normal position piston rod 36 is retracted in cylinder 37. However, when cam 43 moves the actuator, the piston rod 36 is extended, moving pusher 35 parallel to the axes of rolls 23 so as to transfer the gizzard from the ribbed 24 portion to the tooth 26 portion of the rolls. As will be seen in the drawings, the cam 43 is relatively short so that piston rod 36 is retracted immediately following its extension.

Gear 44 is driven by power means 13 so that it is actuated in timed relationship to the movement of the gizzards carried by chain 11. To this end the power means 13 also drives a gate (not shown) for loading the gizzards onto the chain 11 in timed relationship. Such a loading apparatus is disclosed and claimed in my application entitled "Feed Apparatus For A Poultry Gizzard Processing Machine," Ser. No. 588,176, filed concurrently herewith, the disclosure of which is incorporated herein by reference. Alternatively a control means could be provided by which valve 38 would be actuated by a sensor positioned along the path of movement of the gizzards which would detect the presence of a gizzard at that particular point along the path of movement.

A downwardly inclined discharge chute 48 is positioned along the lower of rolls 23. Positioned along the higher of the rolls 23 is a shelf 49 having the same downward inclination as chute 48. The inclination is such that it substantially corresponds to the inclination that would be found in a line connecting the axes of rotation of rolls 23. Chute 48 and shelf 49 have converging edges 50 and 51 respectively. At the lower end of chute 48 is a discharge trough 52 having a bottom formed by spaced rods 53. A spray head 54 directs a spray of water onto the discharge area of the machine.

As a stomach, preceding a gizzard, approaches the discharge point of the conveyor it descends into opening 25. The gizzard attached thereto, and following along behind, is driven over onto support 31 by the jets from nozzles 33 as it reaches the discharge point. The exposed interior of the gizzard is, at this time, laying across surface 32 of the support. In the meantime the stomach is being pulled downwardly by ribs 24 of rolls 23. This along with the sheet of water from nozzle 30 causes the gizzard to move downwardly onto rolls 23 in a manner such that the exposed interior of the gizzard is in juxtaposition to the rolls. The stomach is detached from the gizzard as pusher 35 traverses the top of the rolls moving the gizzard onto the toothed 26 portion of the rolls. The configuration and rotation of the toothed 26 portion of the rolls 23 is such as to detach the lining from the exposed interior of the gizzard. At the same time the helical configuration of teeth 26 moves the gizzard toward the converging edges 50 and 51. In the meantime pusher 35 will have retracted to the position illustrated. When the gizzard reaches the converging edges 50 and 51 it moves up across those edges onto chute 48 and shelf 49. From this point the gizzard slides down the chute into discharge trough 52. The movement of the gizzard down the chute is assisted by the water spray from head 54.

I claim:

1. In a poultry gizzard processing machine wherein the cut gizzards are moved sequentially along a conveyor to a discharge station with the open interior of the gizzard upwardly and wherein there are roll means having a portion thereof below the top of the conveyor at the discharge station, said portion of roll means being adapted to pull down on the stomach, if any, of the gizzard deposited on the top thereof from the conveyor, said roll means having a second portion adapted to remove the lining from the interior of the cut gizzard, the improvement comprising: means for contacting the gizzard at the discharge station and for depositing the gizzard with the exposed interior of the gizzard downwardly on said first portion; and pusher means movable between the top of the first portion and the top of the second portion for moving the gizzard so deposited on the first portion to the second portion.

2. In a gizzard processing machine as set forth in claim 1, wherein said means for contacting the gizzard includes a support above said first portion and spaced a short distance beyond said discharge station, said support having a surface above and inclined downwardly towards the top of said first portion, and water jets directed at said discharge station and generally toward said support for contacting the exterior of the gizzard and moving it toward the support with the exposed interior of the gizzard against said surface.

3. In a gizzard processing machine as set forth in claim 2 and with said first portion of roll means comprising a pair of approximately horizontal rolls having axes transverse to the path of movement of the gizzard to the discharge station, the improvement comprising: said machine includes a shelf along said first portion at the side thereof opposite said conveyor, said shelf being above and inclined downwardly toward said first portion, said support being spaced above said shelf, and including means to discharge a flow of water down along said shelf under said support.

4. In a gizzard processing machine as set forth in claim 3, wherein said pair of rolls form both said first portion and said second portion with said axes extending the full length of the two portions, one of said axes being at a greater elevation than the other of said axes.

5. In a gizzard processing machine as set forth in claim 1, wherein said pusher means is operated in timed relationship to the movement of gizzards along said conveyor.

6. In a gizzard processing machine as set forth in claim 1 and with said roll means comprising a pair of rolls having approximately horizontal axes, the improvement comprising: said pusher means including an air cylinder having a piston movable along a line parallel to said axes, said cylinder being mounted on said frame adjacent one end of said rolls.

7. In a poultry gizzard processing machine wherein the cut gizzards are moved sequentially along a conveyor to a discharge station with the open interior of the gizzard upwardly and wherein there are roll means having a portion thereof below the top of the conveyor at the discharge station and having a second portion adapted to remove the lining from the interior of the cut gizzard, the improvement comprising: positioning means at the discharge station for contacting the gizzard released from the conveyor at the discharge station and for depositing the released gizzard with the exposed interior of the gizzard downwardly on said first portion.

8. In a gizzard processing machine as set forth in claim 7 and with said first portion of roll means comprising a pair of approximately horizontal rolls having axes transverse to the path of movement of the gizzard to the discharge station, the improvement comprising: said positioning means includes a shelf at said first portion at the side thereof opposite said conveyor, said shelf being above and inclined downwardly toward said first portion, and water jets directed at said discharge station and generally toward said shelf for contacting the exterior of the gizzard and moving it toward the shelf with the exposed interior of the gizzard toward said shelf.

9. In a gizzard processing machine as set forth in claim 8, wherein said positioning means includes a support above said first portion and spaced a short distance beyond said discharge station, said support having a surface inclined downwardly towards the top of said first portion, said support being spaced above said shelf; and including means to discharge a flow of water down along said shelf under said support.

10. In a machine as set forth in claim 7 with said roll means comprising a pair of rolls having longitudinal axes, the improvement comprising: said first portion of each of said rolls comprising a plurality of ribs on each roll parallel to the axis thereof and defining valleys therebetween, said axes being positioned so that the ribs of one roll are spaced from the ribs of the other roll sufficiently to permit a stomach to pass therebetween while being smaller than the thickness of a cut gizzard, said second portion of said rolls having interengaging means for removing the lining of the gizzard.

11. In a machine as set forth in claim 10, including a power operated pusher means movable across the tops of said rolls and adjacent thereto in timed relationship to the movement of the conveyor to force the gizzard from the first portion to the second portion.

References Cited
UNITED STATES PATENTS

| | | | |
|---|---|---|---|
| 2,787,362 | 4/1957 | Hill. | |
| 2,787,806 | 4/1957 | Jett et al. | 17—11 |
| 3,159,872 | 12/1964 | Hill | 17—45 |
| 3,172,148 | 3/1965 | Hill | 17—11 |

LUCIE H. LAUDENSLAGER, *Primary Examiner.*